United States Patent [19]

Polaner

[11] 4,268,289

[45] May 19, 1981

[54] FLAME ARRESTING AIR FILTER ELEMENT

[75] Inventor: Mardy Polaner, Birmingham, Mich.

[73] Assignee: Barbron Corporation, Detroit, Mich.

[21] Appl. No.: 115,828

[22] Filed: Jan. 28, 1980

Related U.S. Application Data

[63] Continuation of Ser. No. 28,949, Apr. 11, 1979, abandoned, which is a continuation of Ser. No. 825,807, Aug. 19, 1977, abandoned, which is a continuation of Ser. No. 649,144, Jan. 14, 1976, abandoned.

[51] Int. Cl.³ .................. B01D 50/00; B01D 46/24; B01D 46/52
[52] U.S. Cl. .................. 55/486; 29/163.5 F; 55/498; 55/524; 55/526; 55/DIG. 5
[58] Field of Search .............. 55/482, 486, 498, 510, 55/524–526, DIG. 5; 29/6.1, 6.2, 163.5 F; 113/116 A

[56] References Cited

U.S. PATENT DOCUMENTS

| | | | |
|---|---|---|---|
| 1,664,629 | 4/1928 | Kielberg | 29/6.2 |
| 2,037,164 | 4/1936 | Harrah | 55/525 X |
| 2,262,013 | 11/1941 | Lang | 55/510 X |
| 2,829,733 | 4/1958 | Bartels et al. | 55/526 |
| 3,031,827 | 5/1962 | Onstad et al. | 55/526 |
| 3,209,520 | 10/1965 | McKinlay | 55/498 X |
| 3,681,898 | 8/1972 | Hopkins et al. | 55/498 X |
| 3,940,547 | 2/1976 | Needham et al. | 428/461 X |

FOREIGN PATENT DOCUMENTS

| | | | |
|---|---|---|---|
| 599541 | 6/1960 | Canada | 55/498 |
| 634895 | 1/1962 | Canada | 55/498 |
| 893085 | 4/1962 | United Kingdom | 55/510 |

OTHER PUBLICATIONS

"Expanded Aluminum," *Modern Metals*, 5-1947, p. 21.

Primary Examiner—Kathleen J. Prunner
Attorney, Agent, or Firm—Krass, Young & Schivley

[57] ABSTRACT

A flame arresting filter element for air intake systems has an outer ring of pleated filtering paper and an inner, concentric ring formed of expanded metal foil, longitudinally stretched and laterally compressed so as to be adapted to diffuse and quench frames resulting from engine backfire. The inner ring is coated with a relatively inert, cohesive substance to provide a unitary structure. The two rings are provided with resilient end caps.

5 Claims, 4 Drawing Figures

FLAME ARRESTING AIR FILTER ELEMENT

REFERENCE TO RELATED APPLICATIONS

This application is a continuation of application Ser. No. 028,949, filed Apr. 11, 1979 and now abandoned; which was a continuation of application Ser. No. 825,807, filed Aug. 19, 1977 and also abandoned; which was a continuation of application Ser. No. 649,144, filed Jan. 14, 1976, also abandoned.

INTRODUCTION

This invention relates to air intake systems for internal combustion engines and more particularly to a flame arresting filter element adapted for use with such systems.

BACKGROUND OF THE INVENTION

Internal combustion engines using a vaporized admixture of air and gasoline or some other like combustible substance are invariably provided with an air intake system. An attendant problem with the use of such engines is the hazard of engine backfire. If the engine backfires through the carburetor in a volatile environment there is a substantial risk of injury to person and property unless the air intake system is provided with means to arrest or retard the flame emerging from the carburetor.

The prior art has included various approaches to the solution of this problem; most of which have required extensive and costly changes to the design of the conventional air intake system and its filter element.

One approach has been to provide the overhead portion of the air intake assembly with an interior, downwardly projecting dome adapted to reflect a flame emerging from the carburetor away from the filter element. Besides requiring a costly reworking of the air intake assembly, this system has no positive feature to arrest or attenuate the spreading flame.

Another approach has been to immerse the porous material in the filtering element in water soluble oil saturates or other like flame retardant solutions. The cost and manufacturing disadvantages of this solution are manifest.

Thus it has become desireable to design a relatively low-cost, readily manufacturable device that will provide positive flame arresting or retarding means in the event of engine backfire through the carburetor without otherwise detracting from the efficient operation of the air intake system. Such is the objective of the present invention.

BRIEF SUMMARY OF THE INVENTION

The present invention is an improved air filter element, readily adapted for use with conventional air intake systems, which is capable of arresting or retarding the spread of flames occurring in the event of engine backfire.

In general, the filter element is comprised of two concentric annuli of porous material. The first and outer annulus is formed of a conventional porous material, such as pleated paper. The second and inner annulus is formed of layers of longitudinally stretched and laterally compressed expanded metal foil. The inner annulus acts as a flame arrester by diffusing and cooling any flames emerging from the carburetor into the highly thermally conductive, labyrinthine structure. The inner annulus does not, on the other hand, materially impede the passage of air to the carburetor in the normal course of engine operation.

In the preferred form the inner annulus is bonded into a unitary structure by coating with a relatively inert, cohesive substance.

Still further features and additions to the basic embodiment will be made apparent by the following detailed description of a specific embodiment.

DETAILED DESCRIPTION OF THE SPECIFIC EMBODIMENT

Figure 1:
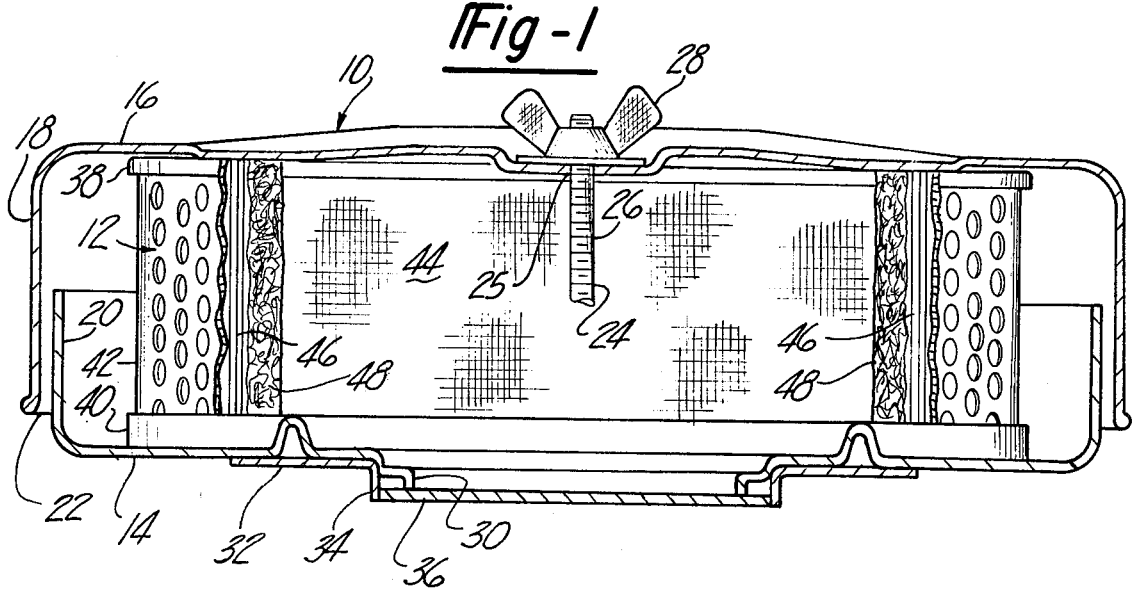
FIG. 1 is a sectional view of a conventional air intake assembly employing a filter element embodying the present invention.

FIG. 1 shows a conventional air intake assembly 10 of an internal combustion engine utilizing a filter element 12 embodying the present invention.

The filter element 12 is supported by a tray 14 which has an upwardly projecting annular bead to prevent lateral displacement of the filter within the assembly 10. The tray 14 has a central opening leading to the carburetor bounded by a downwardly turned flange 30. A downwardly turned flange 34 of a support plate 32 acts in conjunction with flange 30 to define an opening for the circumferential sealing flange on the upper periphery of the carburetor (not shown).

The filter element 12 is enclosed within the assembly by a cover 16. The cover 16 has a depending annular side wall 18 which extends radially beyond an upstanding flange 20 of the tray 14 to define an air intake opening 22 between the two. The cover 16 is rigidly positioned by means of an upwardly extending rod 24 having a threaded end 26 that passes through an aperture 25 in the cover to engage with a wing nut 28.

Figure 4:
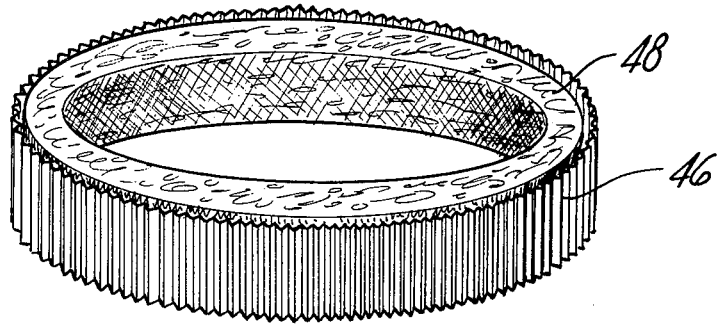
FIG. 4 is a perspective view of the flame arresting core of FIG. 2 shown in cooperation with a ring of conventional porous filter material.

The filter element 12 is shown as an annular assembly. It comprises an outer annulus of a conventional porous filtering material such as pleated paper 46. Disposed concentrically within the outer annulus 46 is an inner annulus 48 designed to perform as a flame arrester in the event of engine backfire through the carburetor. The inner annulus 48 is formed of layers of longitudinally stretched and laterally compressed expanded metal foil. The layers of the inner annulus 48 are bonded into an unitary assembly by coating the layers formed annulus with a relatively inert cohesive substance, such as polyolefin, an ethylene plastic. As shown in FIG. 4 the outer diameter of annulus 48 is substantially the same as the inner diameter of annulus 46 allowing the respective surfaces of the annuli to be in substantially mating relationship.

Figure 3:
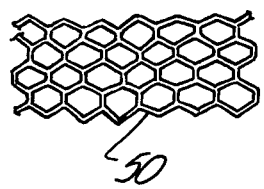
FIG. 3 is a view showing the expanded metal foil from which the flame arresting core of FIG. 2 is formed.

The annulus 48 is formed from a base material of expanded metal foil mesh having a mesh size of approximately $\frac{1}{4}$ to $\frac{3}{8}$ inch shown generally at 50 in FIG. 3. In the preferred embodiment, the metal is steel, but alternative metals, such as aluminum, brass, copper or stainless steel are also suitable.

Figure 2:
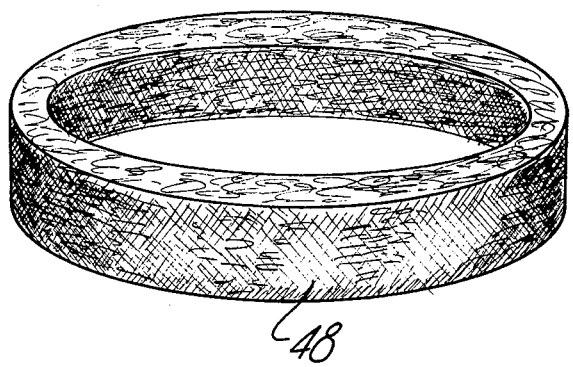
FIG. 2 is a perspective view of the flame arresting core shown used in connection with the filter element of FIG. 1.

To form the flame arresting annulus 48 a sheet of the expanded metal foil mesh 50 is cut to beginning dimensions per the specific application. In a typical application such dimensions may be 36 inches by 18 inches. The sheet of foil mesh 50 is folded longitudinally several times, preferably four, and then stretched by opposed longitudinal forces to increase its length by one-third to one-half and reduce its width by a like ratio. The semi-formed product is rolled about a mandrel to develop a basic annular shape. This basic annulus is placed as a blank in a press having an annular die and ram. The pressing operation reduces the axial dimension by approximately a factor of two and correspondingly increases the wall density. The total process yields a tightly packed, finely poured annulus 48 of expanded metal foil as shown in FIG. 2.

As indicated, the formed annulus 48 may be bonded into a unitary assembly by coating the layers with a relatively inert cohesive substance so as to join the layers together. This may be accomplished by dipping the formed annulus 48 in a polyolefin, such as the commercially available product sold under the trademark Microthene, and baking it an appropriate length of time.

The outer and inner annuli 46 and 48 are housed by corresponding outer and inner cylindrical sleeves, 42 and 44 respectively. Outer sleeve 42 is formed from a thin gage sheet metal and has a plurality of relatively large apertures over its surface. Inner sleeve 44 is formed of flexible but firm wire cloth. The top and bottom of the filter element 12 are provided with resilient end caps 38 and 40. The caps 38 and 40 are designed to bear against the adjacent cover 16 and tray 14 respectively to develop an airtight seal therebetween and thereby force the air flow to enter the filter element 12 through sleeve 42. In the preferred embodiment the end caps 38 and 40 are formed on the filter element 12 by placing the ends in molds of a suitable molding material such as the product sold under the trademark Plastisol and oven curing.

When in operation the filter element 12 arrests the spread of flame occurring due to engine backfire by diffusing and cooling the flame as it enters the inner annulus 48. The relatively high thermal conductivity of the expanded metal foil quickly absorbs the thermal energy of the flame and diminishes the likelihood that the flame will reach the environment where the presence of combustible vapors could result in an explosion.

Hence the invention is seen to provide a design simple in manufacture and operation as well as low in cost. The invention represents a marked improvement over prior art designs attempting to reach the same functional objectives.

To those skilled in the art to which the invention relates, many changes in construction and widely varying embodiments and applications of the invention will suggest themselves without departing from the spirit and scope of the invention. The disclosures and the description herein are purely illustrative and are not intended to be in any sense limiting.

The embodiments of the invention in which an exclusive property or privilege is claimed are defined as follows:

1. An improved air filter element of the type having an annulus of porous material for the filtering of particulate contaminants in air entering a carburetor intake or the like, wherein the improvement comprises: an annulus formed by longitudinally folding an elongated section of expanded metal foil, stretching the folded section by applying opposed longitudinal forces, rolling the stretched section into annular form and pressing the section to reduce its axial dimension and increase its density, the metal annulus being concentrically disposed within the annulus of porous material in order to provide flame arresting capabilities of the filter element.

2. The air filter element of claim 1 wherein the expanded metal foil is steel.

3. The air filter element of claim 1 wherein the annulus of expanded metal foil is coated with ethylene plastic.

4. The air filter element of claim 3 wherein the ethylene plastic is polyolefin.

5. The air filter element of claim 1 wherein the inner radial surface of the annulus of porous material and the outer radial surface of the annulus of expanded metal foil are in substantially mating relationship.

* * * * *